United States Patent [19]
Phillips

[11] Patent Number: 5,368,485
[45] Date of Patent: Nov. 29, 1994

[54] OVERLAY SYSTEM FOR DESIGN SELECTION

[76] Inventor: Elizabeth L. Phillips, 22912 Via Genoa, Monarch Beach, Calif. 92629

[21] Appl. No.: 934,109
[22] Filed: Aug. 21, 1992
[51] Int. Cl.$^5$ ............................................. G09B 25/00
[52] U.S. Cl. ..................................................... 434/75
[58] Field of Search ........................ 434/75, 76, 78–80, 434/367–369, 257, 269

[56] References Cited

U.S. PATENT DOCUMENTS

| | | | |
|---|---|---|---|
| 664,828 | 1/1901 | Banner . | |
| 799,609 | 9/1905 | Ludwig . | |
| 1,453,833 | 5/1923 | Fleming et al. . | |
| 1,626,150 | 4/1927 | Parda . | |
| 1,657,413 | 1/1928 | Schumer | 434/94 |
| 2,294,465 | 9/1942 | Lasker . | |
| 2,309,390 | 1/1943 | Grossguth et al. . | |
| 2,756,515 | 7/1956 | Hoffman . | |
| 2,890,531 | 6/1959 | Gracier . | |
| 2,919,502 | 1/1960 | Henry . | |
| 3,120,066 | 2/1964 | Reeves . | |
| 3,135,058 | 6/1964 | Haas et al. . | |
| 3,269,043 | 8/1966 | Swanson . | |
| 3,325,917 | 6/1967 | Kinnaman . | |
| 3,339,453 | 9/1967 | Udich . | |
| 3,389,480 | 6/1968 | Holland | 434/170 X |
| 3,564,734 | 2/1971 | Abraham | 434/76 |
| 3,773,154 | 11/1973 | Mitchell . | |
| 4,055,011 | 10/1977 | Longenecker . | |
| 4,121,358 | 10/1978 | Kistner | 434/76 |
| 4,137,650 | 2/1979 | Hayes . | |
| 4,213,520 | 7/1980 | Sarna et al. . | |
| 4,371,345 | 2/1983 | Palmer et al. . | |
| 4,505,682 | 3/1985 | Thompson | 434/335 |
| 4,539,585 | 9/1985 | Spackova et al. | 434/371 X |
| 4,836,783 | 6/1989 | Harper . | |
| 4,979,324 | 12/1990 | Rehtmeyer et al. | 40/490 |
| 4,991,333 | 2/1991 | McLean et al. | 40/534 |

FOREIGN PATENT DOCUMENTS 0011457 of 1904 United Kingdom .
1590314 5/1981 United Kingdom .

OTHER PUBLICATIONS

Camera Transparencies Sep. 8, 1949.
"Introducing the Visual Window Portfolio . . . Available Exclusively from ADO", The Golden Edge, published by ADO International, vol. 12, No. 8, Aug. 1992, pp. 1–2.
Reproduction of the Visual Window Portfolio by ADO.
"Mastervisions for Windows Advertisement", World of Window Coverings/Show Daily, published by Drapery and Window Coverings Magazine for the New Orleans Drapery and Window Coverings Show, Mar. 19–22, 1992.
Reproduction of the Mastervisions for Window system.

*Primary Examiner*—Gene Mancene
*Assistant Examiner*—Jeffrey A. Smith
*Attorney, Agent, or Firm*—Knobbe, Martens, Olson & Bear

[57] ABSTRACT

An overlay system which enables the user to combine different design elements of a composite design, such as a window treatment, to form a representation of a desired composite design. The overlay system comprises a series of overlay sheets which are preferably clear mylar sheets, each imprinted with both a pictorial representation and a written description of the particular style option depicted thereon. Each particular style of the same category of design element is marked with a visual indicia representative of that particular category of design elements. A user first selects a representation of a window that matches the window that is to be treated. Then the user selects a number of different overlay sheets from one or more categories of design elements. The user combines the overlay sheets until the desired composite design is achieved. Once the desired composite design is achieved, the combination of overlay sheets is aligned to form a representation of the composite design. The representation of the composite design can be reproduced using a standard photocopy machine.

12 Claims, 12 Drawing Sheets

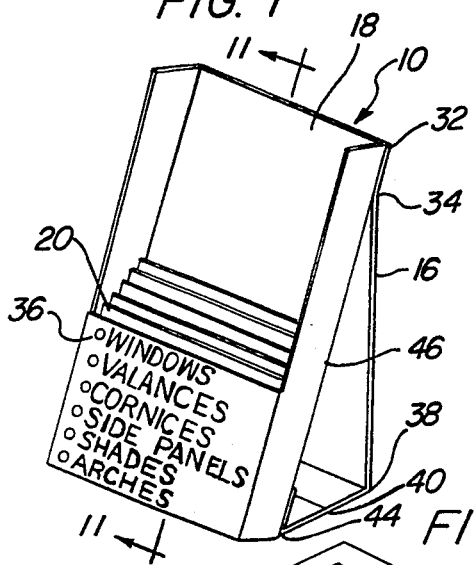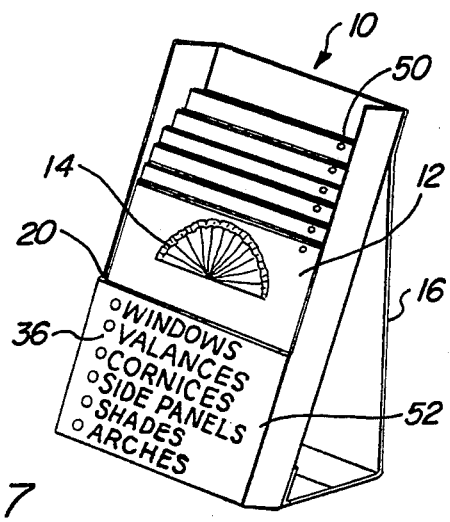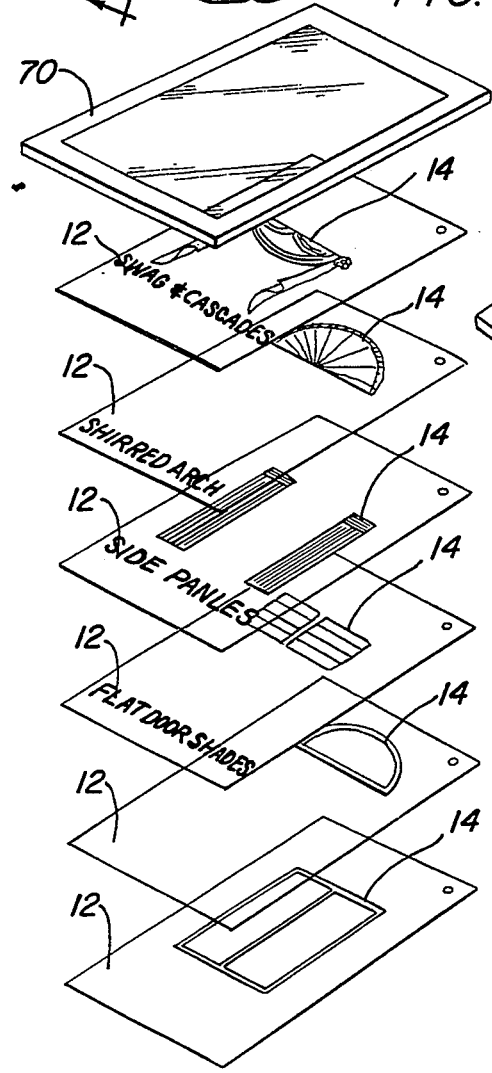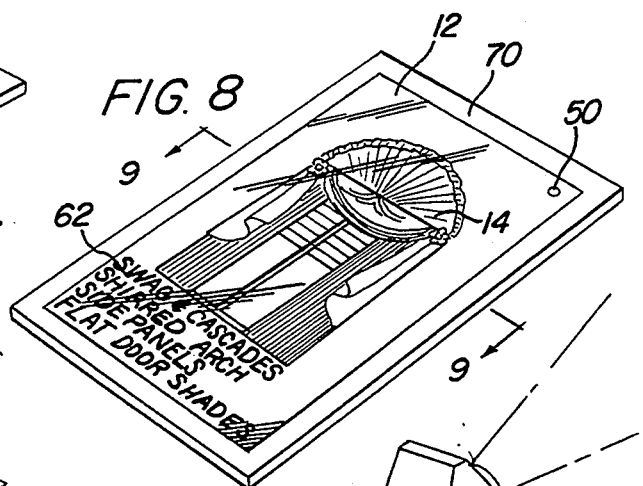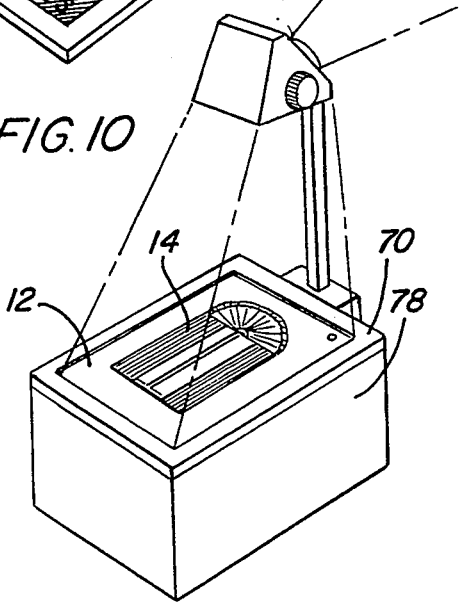

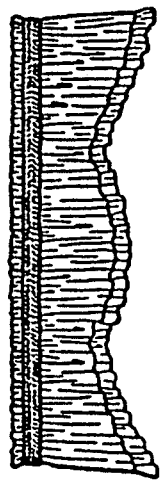
SCALLOPED VALANCE WITH SHIRRED HEADING
V-2
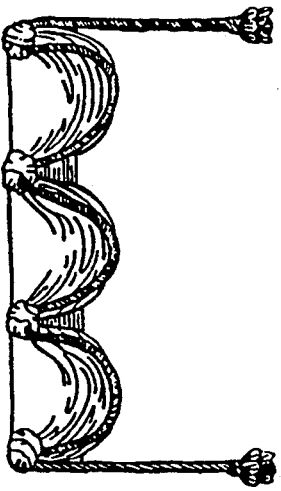
ARTICHOKE VALANCE
V-13
FIG. 14A

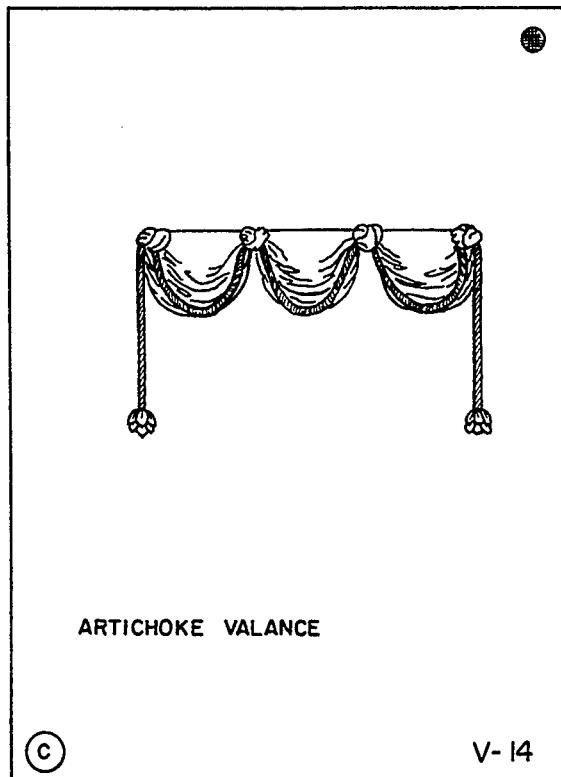
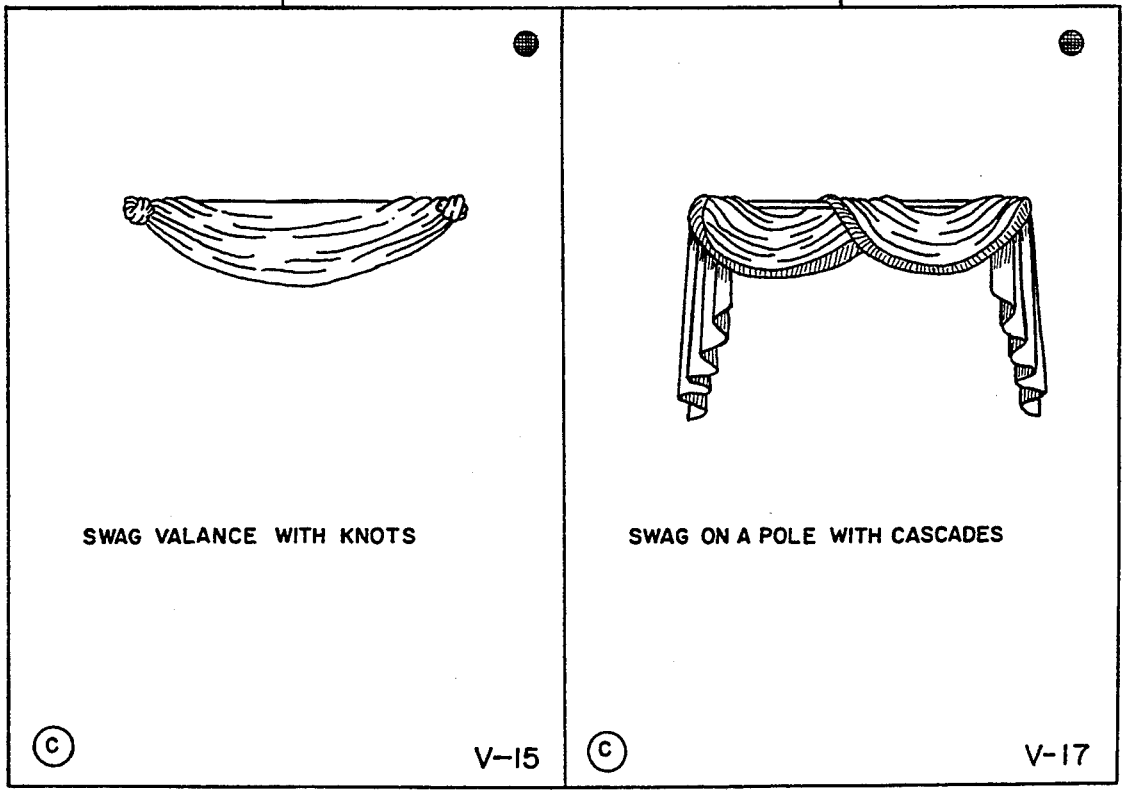
FIG. 14B

OVERLAY SYSTEM FOR DESIGN SELECTION

BACKGROUND OF THE INVENTION

1. Field of the Invention

The invention relates to a device for facilitating the selection of different elements of a composite interior design and more particularly to a device that enables the reproduction of a representation of the selected design.

2. Description of the Related Art

In the field of interior design, it is important to assist the customer in visualizing the final look of a proposed interior design. This is sometimes done by creating a drawing or rendering showing the proposed design and possibly some alternatives. Creating a drawing for a customer is very costly and simply cost-prohibitive for many consumers of interior design products such as draperies and furniture.

The problem of visualization in interior design has been addressed in the prior art when it relates to choosing a specific fabric, wall paper design or floor covering for a completed design. For example, U.S. Pat. No. 3,135,058 discloses a system for combining different fabric patterns with a couch design selected by the customer for easy visualization. This is done by providing a series of opaque sheets, each having a clear cut-out showing a particular couch design. The customer can then place different fabrics behind the selected "couch" sheet. The fabric will then show through the clear "couch" cut-out, giving the customer a better idea of what the fabric will look like on the selected couch. U.S. Pat. No. 2,890,531 discloses a system for viewing the combination of a wall covering with a floor covering to ensure that the two selections match each other. The sample wall and floor covering is placed behind the upper and lower portions, respectively, of a clear sheet with a central opaque depiction of the mid-portion of a room (for example, showing the tub and sink of a bathroom). However, these devices do not go beyond selecting samples of available fabrics, wall coverings or floor coverings. In particular, these devices do not allow the user to combine different elements of a composite design together for visualization, before the color, fabric, wall covering or floor covering selection is made. Further, a copy of the representation is not readily available for the customer to take home.

For example, if a buyer wishes to accessorize a particular window with a window treatment, there is no system in the prior art that will allow the buyer to combine different elements of a window treatment design, such as on the window, valance, shade and side panels, together and view the results. In many cases, it is difficult for the average buyer to select a particular window treatment for a window because it is not easy for the buyer to visualize how the combination of elements that form the window treatment would appear together on a window. In addition, the buyer is usually not familiar with all of the categories of window treatments that are available, nor is the buyer familiar with all of the available styles within each category of window treatment. Thus, an accurate comparison of all of the available combinations of window treatments is not always possible. In addition, most window treatments are purchased in a store environment where the window to be treated is not available. Without the window present it is difficult for the buyer to imagine how a particular window treatment would appear on the specific type of window that is being treated.

SUMMARY OF THE INVENTION

A need exists for a simple overlay system to enable a user to combine different elements of an interior design in order to enable the user to visualize how the elements appear together as a complete design. In addition, there exists a need to be able to reproduce the desired combination of elements for future reference.

The present invention comprises an interior design overlay system which enables the user to readily combine different elements of an interior design together to create a pictorial representation of a desired composite interior design without the need to prepare hand drawings or sketches.

The overlay system comprises a series of overlay sheets which are preferably clear mylar sheets, each imprinted with a representation of a particular style of a design element. Advantageously a black detailed outline of the representation is printed or photocopied onto the mylar sheet and white printing ink is applied to fill in the outline of the design representation.

Each design element is categorized and marked with a visual indicia representative of that particular design element. In addition, an indicia key is provided equating each indicia with its representative category. In the preferred embodiment, the categories of the design elements may include the following: windows, valances, cornices, side panels, shades and arches. Within each category of design elements a number of possible styles exists. Each style is represented on the overlay sheet by a pictorial representation, as well as with a written description of the style.

Preferably, the visual indicia used to identify individual categories of the design elements are colored dots located on the upper right hand corner of each overlay sheet. An indicia key is preferably provided listing each dot color and its corresponding category of design elements. For example, a yellow dot for valance, a red dot for cornices, a green dot for side panels, a blue dot for shades, a purple dot for arches and a white dot for windows. The colored dots are also advantageous, as they allow the user to quickly locate and sort the categories of design elements when the individual overlay sheets are spread out on a surface during use. Further, each category of design elements has its own description line reserved at the bottom of the overlay sheet. The written description lines are positioned on the bottom of the overlay sheets such that upon combination of the overlay sheets the description lines for each category do not overlap.

To produce a representation of the desired composite design, a user first selects an overlay sheet that has a representation of the type of window to be treated. Next, the user selects a number of different overlay sheets representative of a number of different styles from one or more categories of design elements. Then the user combines various overlay sheets until the desired composite design is achieved.

Once the desired composite design is achieved, the combination of overlay sheets are aligned in proper registration and, advantageously placed in a registration holder. The combined set of overlay sheets are then photocopied to achieve a representation of the desired composite design. The photocopy will therefore comprise a copy of the pictorial representation of the selected style from each category of design elements. In addition, the photocopy will include a copy of the written description of the selected styles from each category on their own individual category line.

An alternate embodiment of the present invention includes adapting the overlay sheets for display using an overhead projector. The black detailed outline of the pictorial representation of the design element is applied to the mylar sheets as described above, however the white ink or printing ink is not used to fill in the entire pictorial representation. The overlay sheets are selected and combined as above except they are placed on an overhead projector rather than on a photocopy machine.

BRIEF DESCRIPTION OF THE DRAWINGS

FIG. 1 is a perspective view of the preferred embodiment of the present invention illustrating an open display unit with the overlay sheets removed.

FIG. 2 is a perspective view of the preferred embodiment of the present invention illustrating an open display unit containing the overlay sheets.

FIG. 4 is an exploded perspective view of several categories of design elements.

FIG. 7 is an exploded view of a typical combination of overlay sheets with the registration holder to illustrate the alignment of each individual overlay sheet to form the composite design.

FIG. 8 is a perspective view of the assembled combination of the overlay sheets of FIG. 7 within the registration holder which form a representation of a composite design.

FIGS. 14A-B are top plan views of a number of exemplary overlays from the valance design element category.

DETAILED DESCRIPTION OF THE PREFERRED EMBODIMENTS

A preferred embodiment of the interior design overlay system of the present invention, as illustrated in FIGS. 1 and 2, is used to produce a representation of a composite window treatment by combining a series of design elements. The system of the present invention includes a display unit 10 which functions as a convenient storage and carrying case, at least two categories of design elements which in combination form a representation of a composite design and a plurality of overlay sheets 12, each of which is imprinted with a pictorial representation 14 of an individual style of a design element. The overlay sheets also have a written description of the style of the design element imprinted on them.

Figure 11:
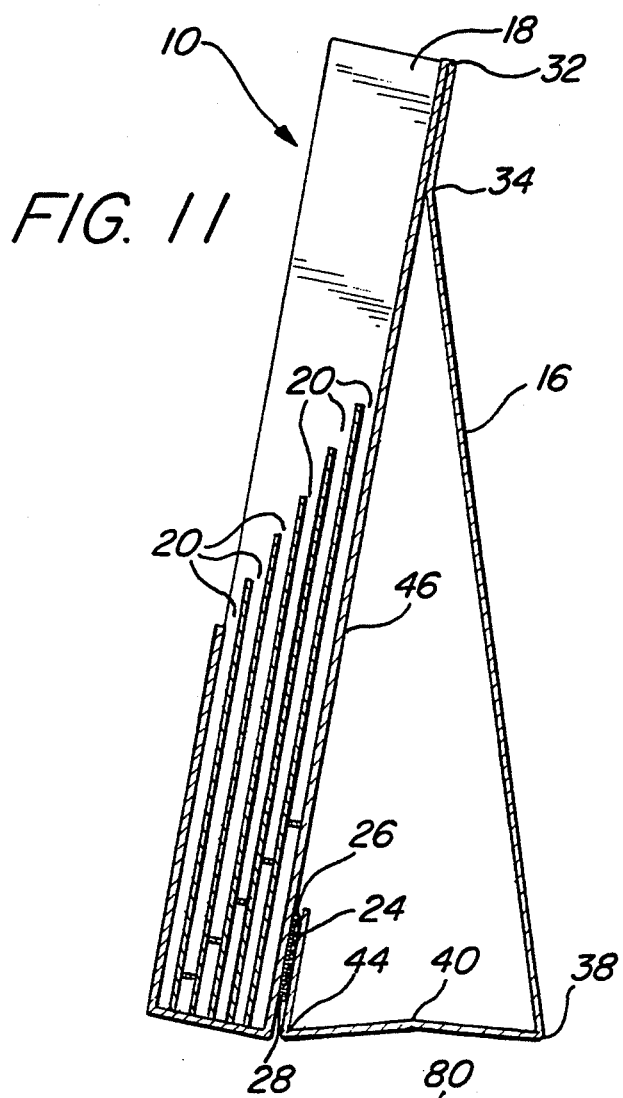
FIG. 11 is a cross sectional view taken through the indicated line illustrating the construction of the display unit of FIG. 1.

FIG. 1 illustrates the display unit 10 in an open position with the overlay sheets 12 removed. FIG. 2 illustrates the display unit 10 in an open configuration containing the overlay sheets 12. The display unit 10 has a lid 16, which also functions as a support for the display unit 10, and a main storage compartment 18. The main storage compartment 18 is divided into several individual storage compartments 20. Each individual storage compartment 20 holds all of the overlay sheets 12 for one category of window treatment design elements. As illustrated in FIG. 11, beginning at the bottom of the main storage area, each successive storage compartment 20 is slightly elevated above the previous compartment. The elevated construction of the individual storage compartments 20 enables the user to easily view and retrieve the overlay sheets 12 of each individual category of design elements from the main storage compartment 18. Also illustrated in FIG. 11, is the two mating portions of a velcro closure 24, a first mating portion 26 is on the lid 16 of the display unit 10 and the second mating portion 28 is on a back panel 46 of the display unit. The lid 16 of the display unit is hinged in several places to enable the lid 16 to act as a support for the display unit 10, as well as a cover for the display unit 10, when the overlay system is transported to different locations. The lid 16 is hinged at a first top portion 32 to cover the top of the display unit, a second top portion 34 to cover a front panel 36 of the display unit, a first middle portion 38 to enable the hinge to act as a support for the display unit, a first bottom portion 40 to cover a bottom panel 42 of the display unit, and at a second bottom portion 44 to cover a portion of a back panel 46. When the lid 16 is in the closed position, the second bottom hinged portion 44 of the lid 16 extends around the bottom panel 42 of the display unit 10 to the back panel 46 to reach the second mating portion 26 of the velcro closure 24. Further, in the closed position, the first mating portion 26 of the velcro closure 24 on the lid 16 is positioned such that it is attached to the second mating portion 28 of the velcro closure 24 on the back panel 46 to hold the display unit 10 in the closed position. When the display unit 10 is open, the hinged middle portion 38 enables the lid to act as a support for the display unit 10; in addition, the second bottom hinged portion 44 rotates to enable the first and second mating portions 26, 28 of the velcro closure 24 to attach to hold the display unit 10 in the open position.

Each category of design elements are marked with a visible indicia representative of the category. In a preferred embodiment, a colored dot 50 in the upper right hand corner of the overlay sheet 12 is used as the visible indicia representing each category. However, any suitable set of visually distinguishable indicia, such as letters for example, could be used. The individual storage compartments 20 are positioned to enable the user to clearly view the colored dot 50 in the upper right hand corner of the overlay sheets 12 when they are placed within the individual storage compartments 20 of the display unit 10.

Figure 3:
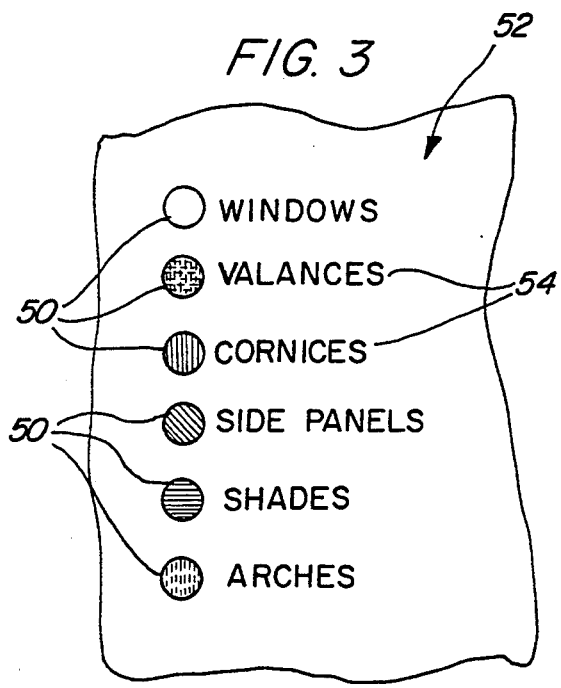
FIG. 3 is an exploded perspective view of the indicia key of the preferred embodiment of the present invention illustrating the color codes for each indicia.

As illustrated in FIGS. 2-3 the front panel 36 of the display unit 10 has an indicia key 52 which equates each individual indicia with its representative category. The indicia key 52 of the preferred embodiment has a series of colored dots 50 and along side each colored dot 50 there is a written description of the category 54 which corresponds to the colored dot 50. In the indicia key 52 of the preferred embodiment, as illustrated in FIG. 3, the following colored dots 50 correspond to the following categories: a white dot represents window styles, a yellow dot represents valance styles, a red dot represents cornice styles, a green dot represents side panel styles, a blue dot represents shade styles and a purple dot represents arch styles.

FIG. 4 is an exploded view of several categories of design elements. FIG. 4 illustrates an exemplary overlay sheet 12 from the following categories of design elements of the preferred window treatment embodiment: the valance category, the arch category, the side panel category, the shade category, and the window category. Each row of FIG. 4 illustrates the overlay sheets 12 corresponding to a single category of design elements. As described above, each category of design elements is represented by a color coded dot 50 in the upper right hand corner of the overlay sheets 12. All of the overlay sheets 12 of the preferred embodiment which belong to the same category have the same color coded dot 50 imprinted on the upper right hand corner of the overlay sheet. Each category of design elements comprises a number of overlay sheets 12 and each overlay sheet 12 within a given category has a pictorial representation 14 of a particular style option of the design element. For example, in the overlay system of the preferred embodiment there are a number of overlay sheets 12 representing different styles of windows, a number of overlay sheets 12 representing different styles of valances, a number of overlay sheets 12 representing different styles of cornices, a number of overlay sheets 12 representing different styles of side panels, a number of overlay sheets 12 representing different styles of shades, and a number of overlay sheets 12 representing different styles of arch coverings. Each overlay sheet 12 which illustrates a particular style of a design element will be indicated with the same colored dot 50 in the upper right hand corner of the overlay sheet. Thus, for example, all overlay sheets illustrating valances will be indicated with the same visual indicia in the upper right hand corner of the overlay sheet. In a preferred embodiment, the visual indicia is a yellow dot.

In addition, each overlay sheet 12 includes an inventory control identifier 56 in the lower right-hand corner of the overlay sheet 12. The inventory control identifier 56 is used as a reference number for placing orders once the composite design has been selected. In the preferred embodiment, the inventory control identifier 56 is an alpha numeric control number. Preferably, the first portion 59 of the inventory control identifier 56 is a letter or a group of letters representing the category of the design element and the second portion 60 is a number representing the specific style illustrated in the pictorial representation 14 on the overlay sheet 12. However, any inventory identifier system can be used, for example a bar code could be used to differentiate each overlay sheet 12 and to enable computerized ordering of each element of the composite deign.

Besides a pictorial representation 14 of the individual style of the design element, each overlay sheet 12 includes a concise written description 62 of the style that is illustrated on the overlay sheet 12. A concise written description 62 of the pictorial representation is positioned on the bottom of the overlay sheet 12 such that when the overlay sheets 12 are stacked one on top of another, the written descriptions 62 on each overlay sheet are not overlapping. Preferably, each design element has a specific line position reserved in the lower portion of the overlay sheet 12 for the written description 62. The position for the written description 62 is different for each category of design elements. Thus, when several design elements are combined, the written descriptions 62 of each element is provided on its own line and can each be read when the composite design is viewed by the user. However, if two types of design elements will never be combined together, the written description of their styles may be positioned on the same line.

The overlay sheets 12 illustrated in FIG. 4 are preferably 8½ inch×11 inch×3-Mil clear transilwrap Mylar. Mylar is the preferred material due to its heat and water resistive properties. The heat resistive properties of the mylar are especially important since the system of the present invention is designed to be photocopied or displayed on an overhead projector, both of which are heat intensive processes. Any other suitable transparent medium, such as acetate for example, may be used. When selecting a suitable material, it is important to consider such factors as susceptibility to tearing and clouding over time.

The overlays sheets 12 are preferably printed on a single side of the mylar sheet using a sheet feed printing press. The printing press uses standard printing plates which are made using photo emulsion lithographic techniques. Preferably, the representation of the design element is printed using standard lithographic printing ink in reverse on the back side of the mylar. Thus when the printing plates are designed the inversion and reverse format of the image must be taken into consideration. The printing is preferably performed using a three-step printing process. First, black ink is printed on the mylar sheet. The black ink portions include the detailed outline of the representation, the outline of the color code circle and the concise written description of the illustration. Secondly, the white opaque ink is applied to the mylar sheet within the detailed outline of the representation. Lastly, the colored ink to fill in the circle in the upper right hand corner of the mylar sheet is printed. However, the second and third printing steps could be reversed such that the colored ink is applied before the white ink. The colored circle, also referred to as the color coded dot 50, is not only used to differentiate between the different categories, but the outline of the colored dot 50 is also used to ensure proper registration of the second and third plates during printing.

The use of black and white opaque ink for the pictorial representation of the design elements is preferred to enable a clear photocopy of the overlay sheets to be made. The black ink used for the outline provides a clear indication for the boundaries of each design element. The white ink blocks the light of the photocopy machine, therefore it blocks the lines from any overlapping boundaries of design elements to prevent a blurred image at the points of combination of the design elements. In addition, the white ink will result in a solid white representation of the composite design, and the black ink will provide a clear outline of the design. The preferred embodiment of the overlay system of the present invention uses black and white inks to permit the making of clear photocopies of the representation of the composite design element on a standard photocopy machine, however colored inks can be used if desired. Alternatively, colored films or inks may be used to provide a colored representation of the composite design element, if desired. Further, once the reproduction is made using a photocopy machine, the reproduction can be colored in by hand.

Figure 5:
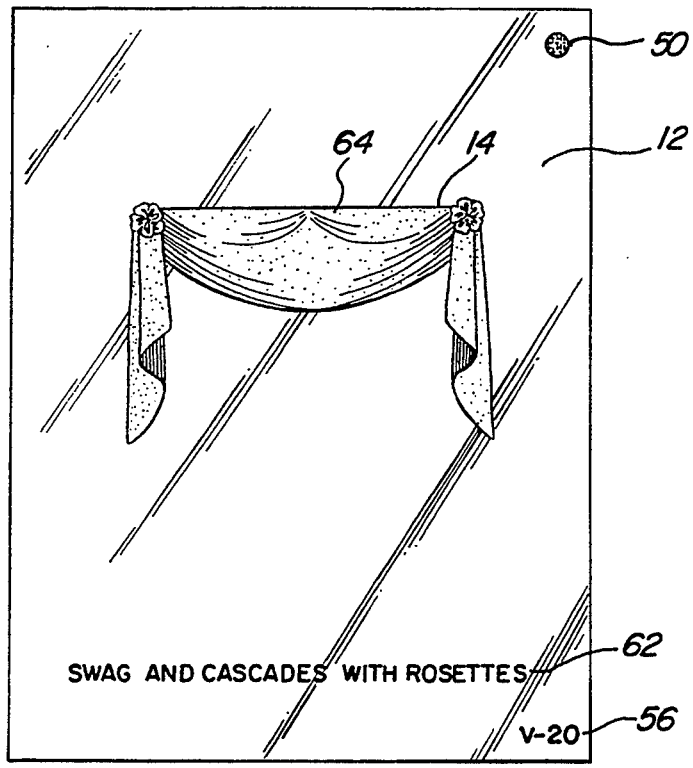
FIG. 5 is a top plan view of a single overlay sheet illustrating the location of the white opaque ink on the mylar sheet.

FIG. 5 is a top plan view of an exemplary overlay sheet 12 of the preferred embodiment. The speckled portions of the overlay sheet illustrate the areas in which the white opaque ink 64 was applied. The white opaque ink 64 is applied to all areas of the pictorial representation that are opaque in reality. For example, if the pictorial representation 14 is illustrating a window, the representation of the glass portions of the window would not be filled in. However, the portions of the window frame that are made of wood, aluminum or any other type of opaque material would be filled in with white ink 64 in the pictorial representation 14. In another example, if a valance is illustrated, as in FIG. 5, the portions of the valance that would be covered with fabric or other opaque material in reality would be filled in with white ink 64 in the pictorial representation 14.

The pictorial representation 14 of the different design elements are individually scaled to a uniform overlay size to enable all of the design elements of the overlay system to be used interchangeably. For example, the representation of a pair of French doors is scaled down much more than the representation of a single window to enable the same valance to be applied to each. Therefore, all of the pictorial representations 14 do not necessarily represent an accurately scaled model of the actual design element. Rather, the pictorial representations 14 are scaled to enable a variety of design elements to be combined together in the overlay system of the present invention to give a customer a representative view of the resulting combination.

Figure 13:
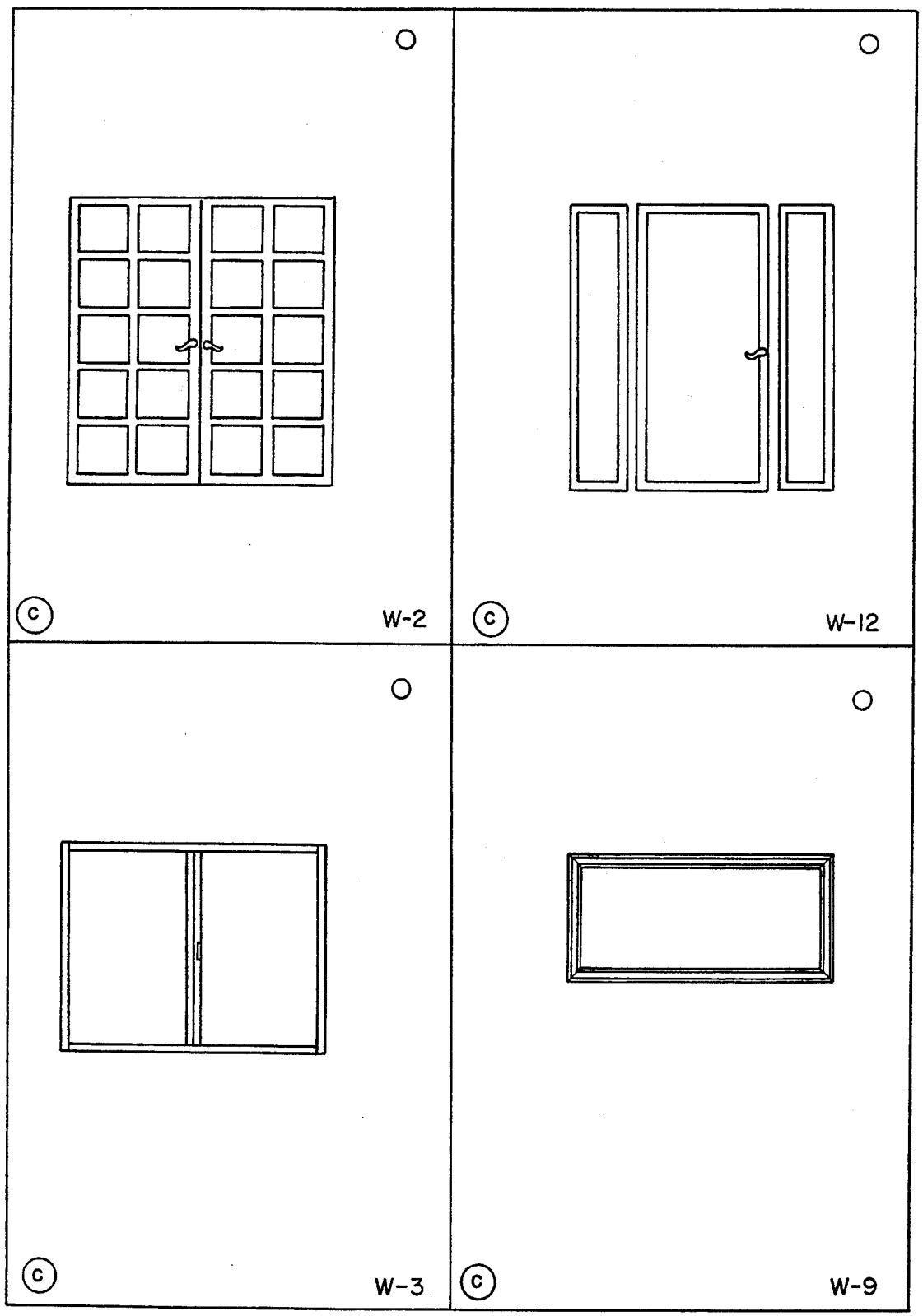
FIG. 13 is a top plan view of a number of exemplary overlays from the window design element category.
Figure 15:
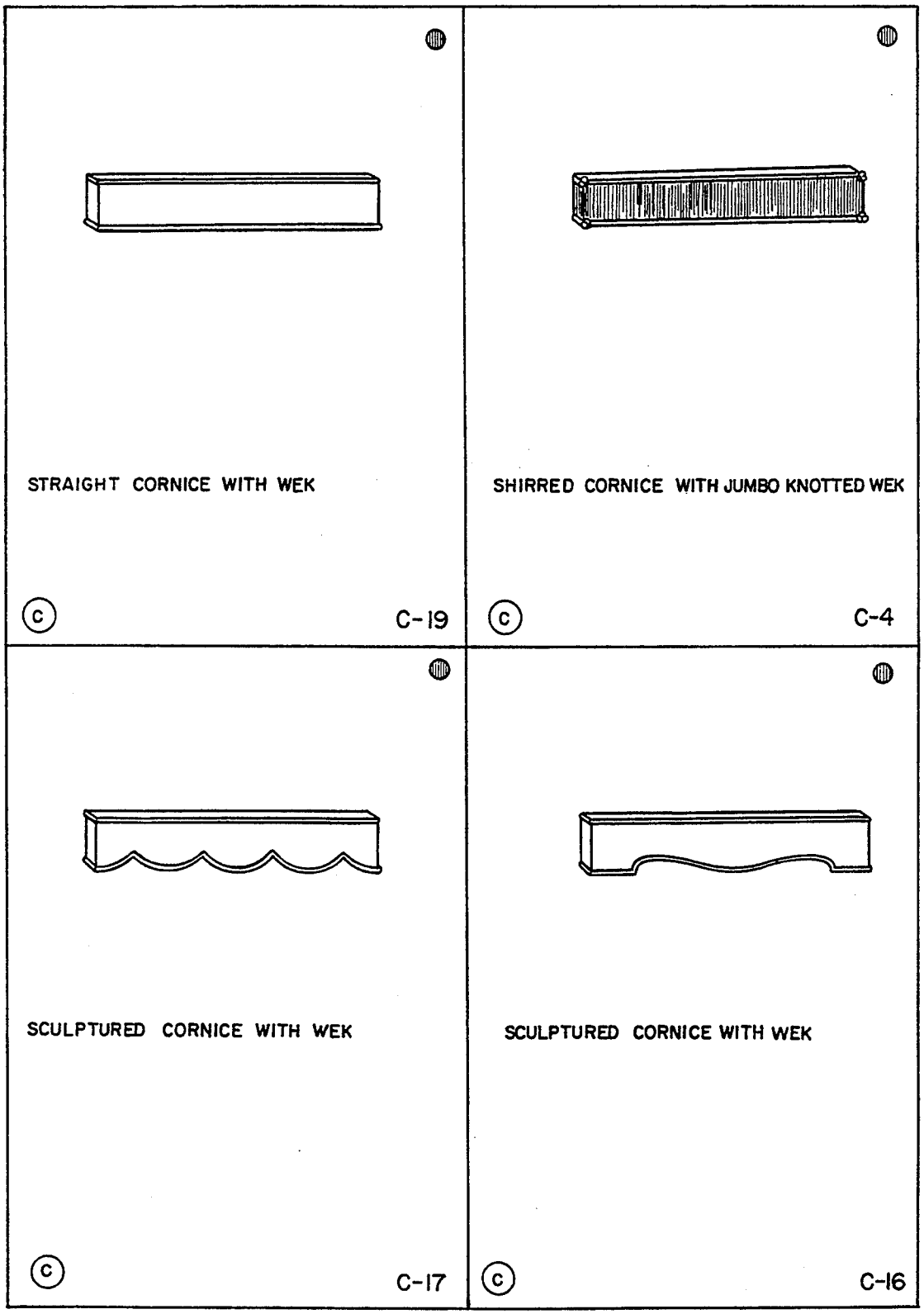
FIG. 15 is a top plan view of a number of exemplary overlays from the cornice design element category.
Figure 16A:
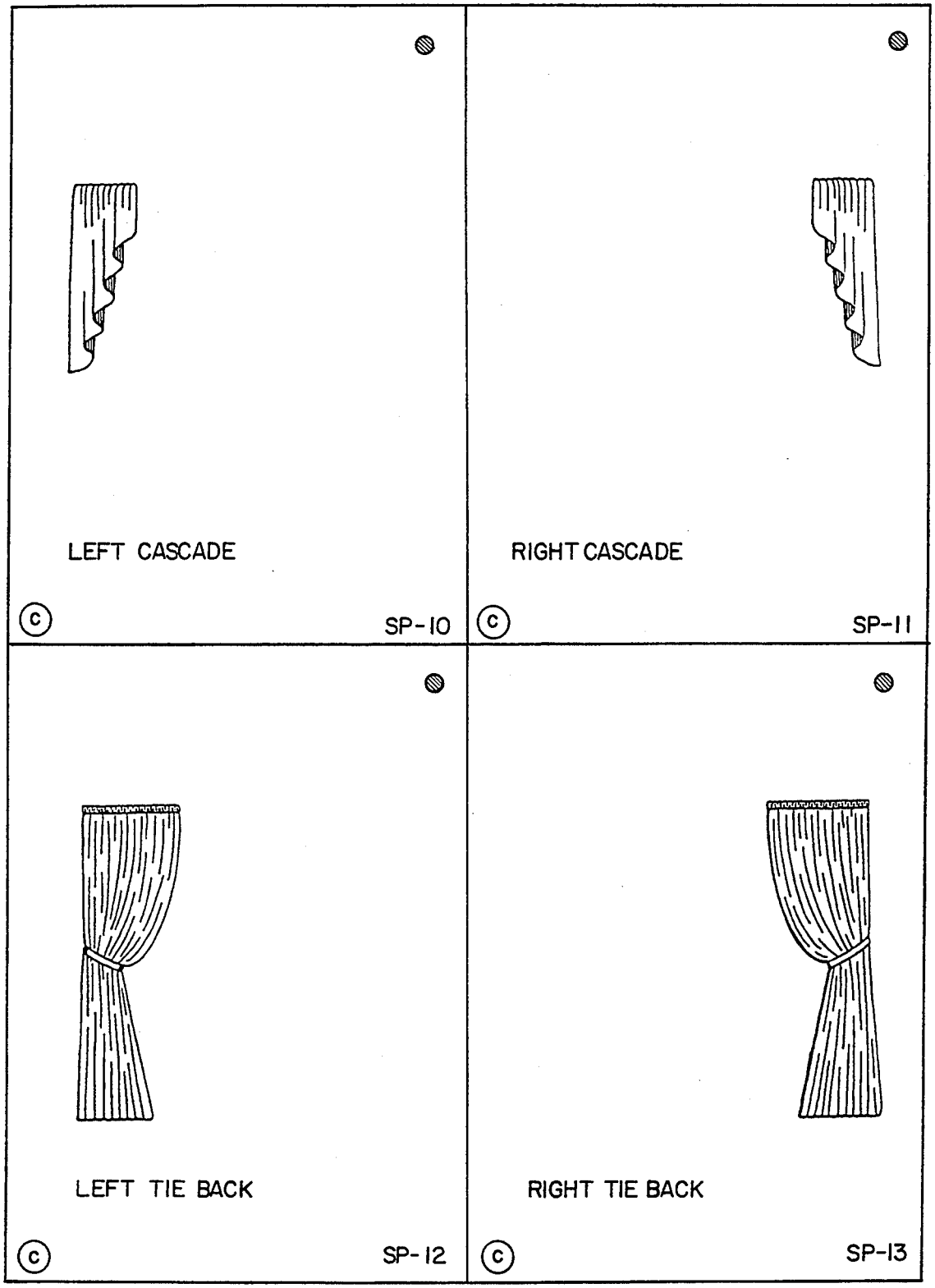
FIGS. 16A-B are top plan views of a number of exemplary overlays from the side panel design element category.
Figure 16B:
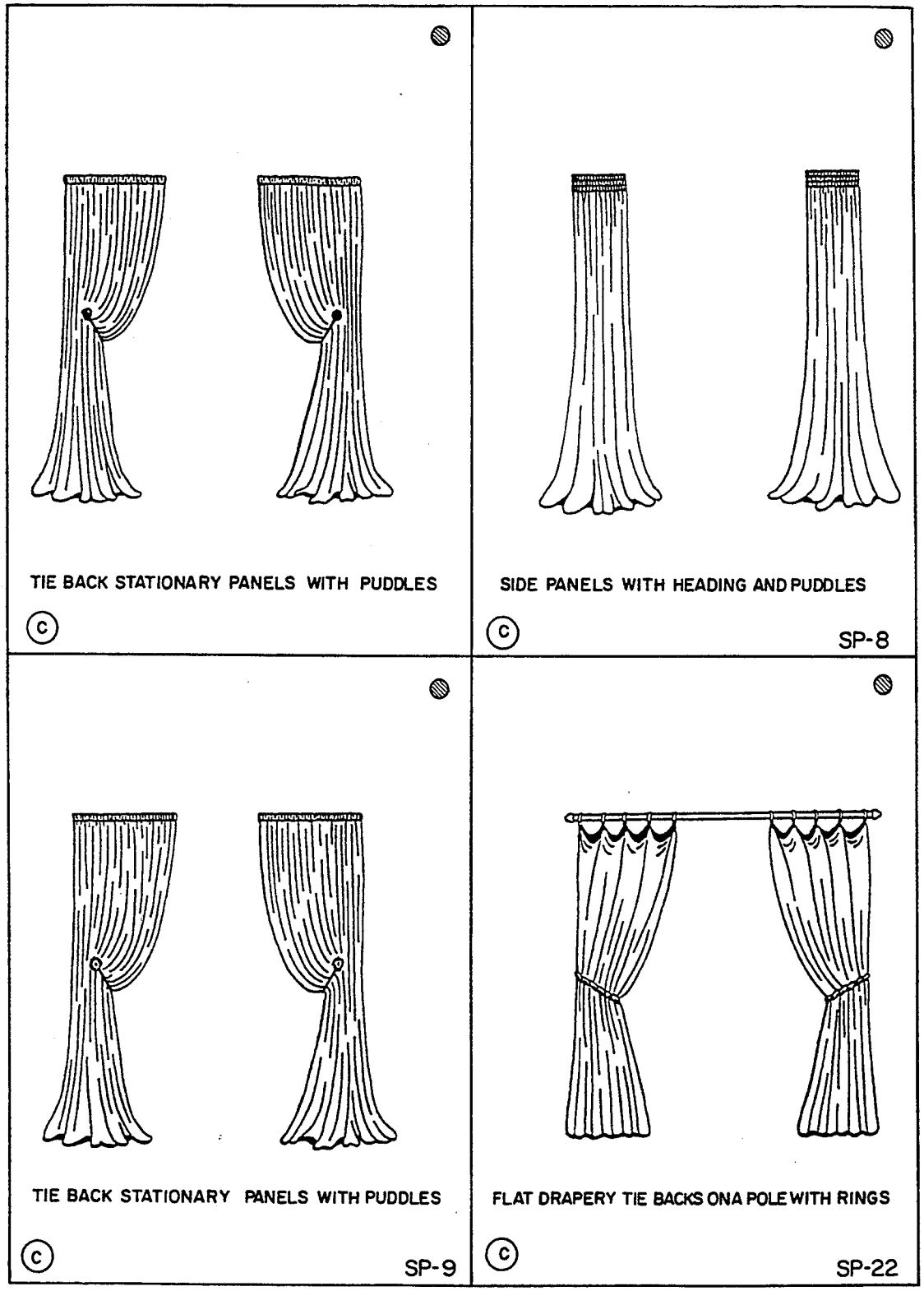
Figure 17:
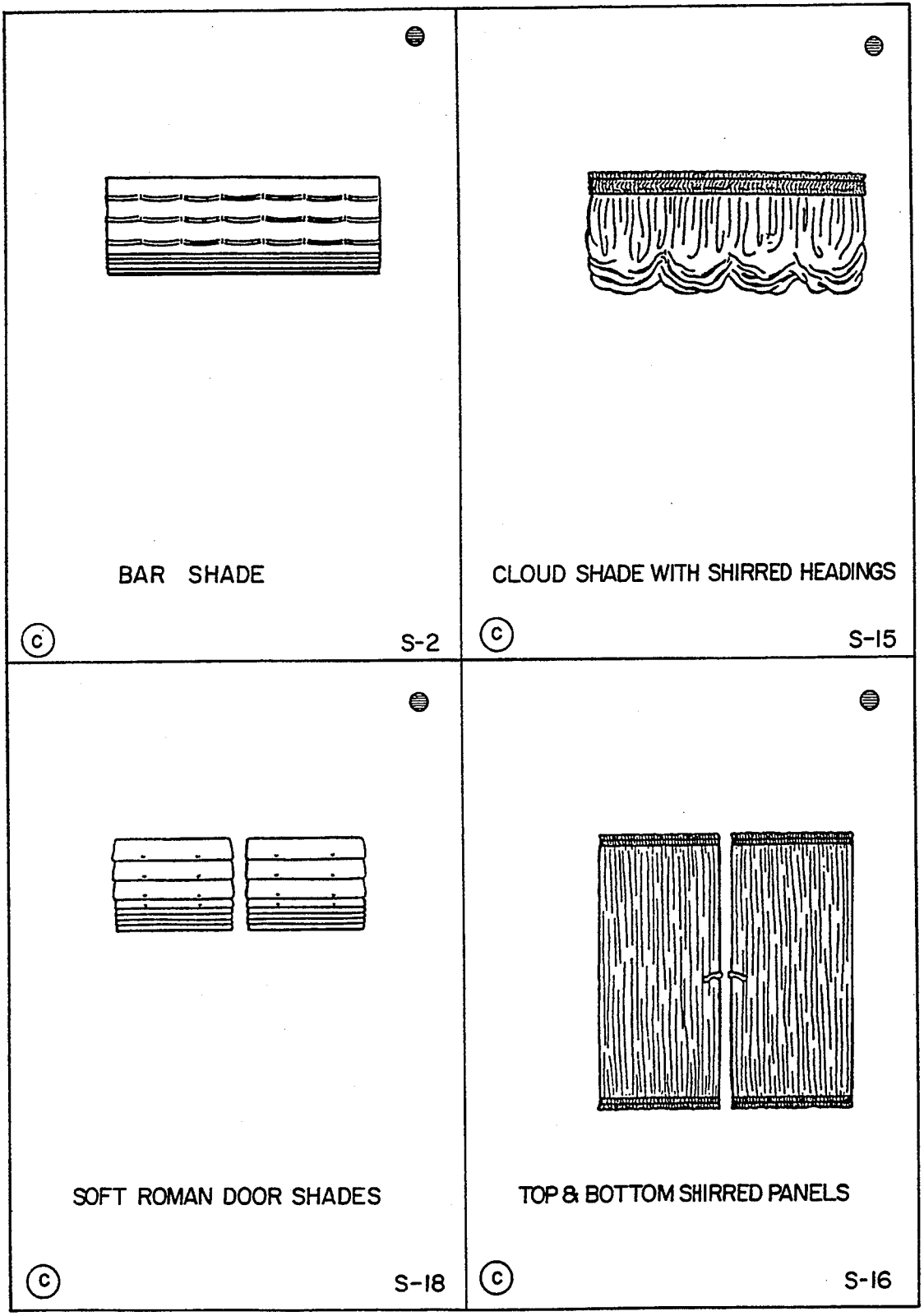
FIG. 17 is a top plan view of a number of exemplary overlays from the shade design element category.
Figure 18:
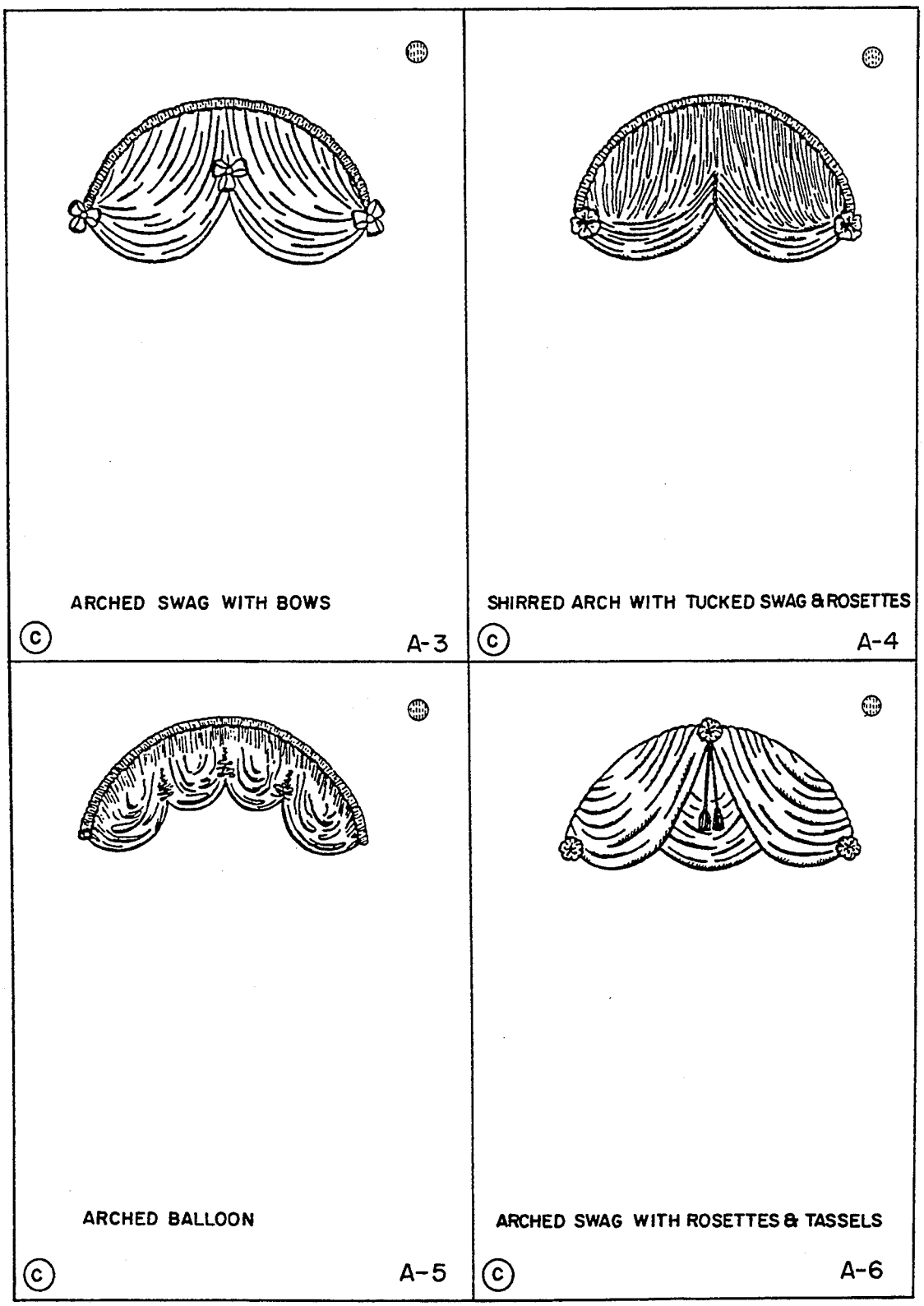
FIG. 18 is a top plan view of a number of exemplary overlays from the arch design element category.

FIGS. 13-18 illustrate a number of exemplary overlay sheets 12 from each category of design elements of the preferred window design embodiment. Preferably, each category of design elements has its own line reserved on the bottom of the overlay sheets for the written description 62. However, as described above, any two categories of design elements which will not appear in combination with each other can share the same line on the bottom of the overlay sheets for the written description. FIG. 13 illustrates a number of exemplary overlays 12 from the window design element category. FIGS. 14A-B illustrate a number of exemplary overlays 12 from the valance design element category. FIG. 15 illustrates a number of exemplary overlays 12 from the cornice design element category. FIGS. 16A-B illustrate a number of exemplary overlays 12 from the side panel design element category. FIG. 17 illustrates a number of exemplary overlays 12 from the shade design element category. FIG. 18 illustrates a number of exemplary overlays from the arch design element category.

To use the overlay system of the present invention, first, one or more overlays 12 with a representation of the window(s) to be treated must be chosen from the available styles in the window representation category (the window category is preferably indicated by a white dot in the upper right hand corner of the overlay sheet of the preferred embodiment). Next, one or more of the remaining categories of design elements are selected (each category is advantageously indicated by a different colored dot in the upper right hand corner of the preferred embodiment). The user will select one or more styles from each of the selected categories for representation. Next, the user will combine the selected overlay sheets 12 representing the various styles from the selected categories one on top of the other. In several cases it is possible for the user to select more than one style from a specific category of design elements. For example, combining an arched window with a French door, or combining a right cascade with a left cascade. The window overlay sheet will be the first one and the sheets representing the proposed treatments will be placed on top thereof. The user may then view the pictorial representation of the completed composite window treatment. The user may then readily substitute one sheet for another with any given category to quickly visualize how a style change in a single design element would affect the overall look. The combination of the various styles within the categories of the design elements will continue until a desired combination of design elements is formed.

Figure 6:
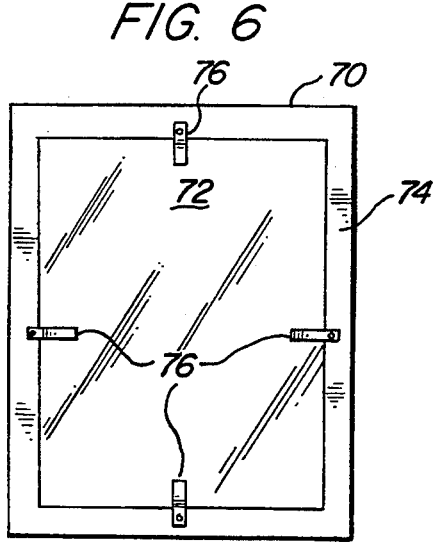
FIG. 6 is a bottom plan view of the registration holder of the preferred embodiment.

FIG. 6 is a back plan view of an optional registration holder 70 which may be used to hold a set of the sheets in registration. The registration holder 70 preferably comprises a backing sheet made of transparent mylar 72 attached to a rigid, cardboard frame 74 along with four position holding pins 76. The position holding pins 76 are oriented in the retracted position as the overlay sheets 12 are stacked on top of the mylar backing sheet 72. Once the overlay sheets 12 are aligned within the rigid frame 74, the position holding pins 76 are rotated to the binding position and hold the overlay sheets 12 in their aligned position. As illustrated in the exploded view of FIG. 7, a number of overlay sheets 12 can be combined with the registration holder 70 of the preferred embodiment of the present invention to achieve the desired composite design.

Figure 9:
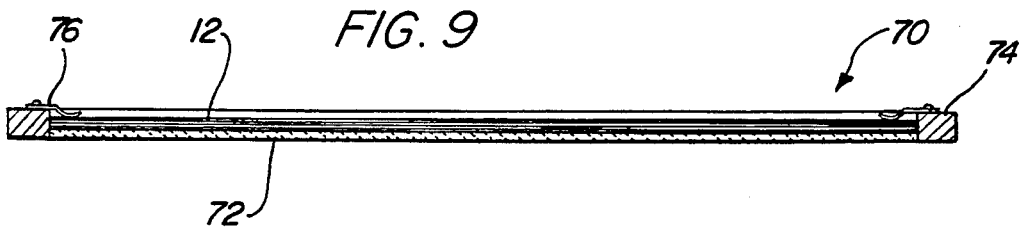
FIG. 9 is a cross sectional view taken through the indicated line illustrating the assembled combination of the overlay sheets within the registration holder of FIG. 8.

Once the desired representation of a window treatment is achieved, the user will insure that the registration of the individual overlays 12 is correct by aligning the colored dots 50 in the right hand corner of each overlay sheet 12. As illustrated in FIG. 8, when the colored dots 50 are aligned, the pictorial representation 14 of the composite design is aligned and the written description 62 on the bottom of the overlays is also aligned. FIG. 9 illustrates a cross sectional view of the aligned overlays 12 of FIG. 8 placed within the preferred registration holder 70. In many situations, the registration holder 70 will not be necessary and the sheets can simply be held in registration by the user. In order to provide for an improved registration of the overlay sheets 12, an additional registration dot of identical size and shape as the illustrated colored dot 50 can be placed in the lower left-hand or right-hand corner of each overlay sheet 12 in the same relative position as the illustrated colored dot 50. Thus, when both the colored indicating dot 50 in the upper right-hand corner and the additional registration dot in the lower left-hand or right hand corner of all of the overlay sheets are in alignment, all of the overlay sheets 12 which form the composite design are aligned in all directions. Further, the inventory control identifier 56 on each overlay sheet 12 can be used as a registration indicator, if desired.

The overlay sheets 12 in the registration holder 70 are placed on a standard photocopy machine, and a copy of the window treatment representation is made. In addition, if the registration holder 70 is not used, the overlay sheets 12 may be aligned with each other directly on the glass of the photocopy machine. The completed photocopy of the representation of the desired window treatment includes a pictorial representation 14 of the desired composite window treatment along with a written description 62 of the style of each design element that forms the combination.

Figure 10:
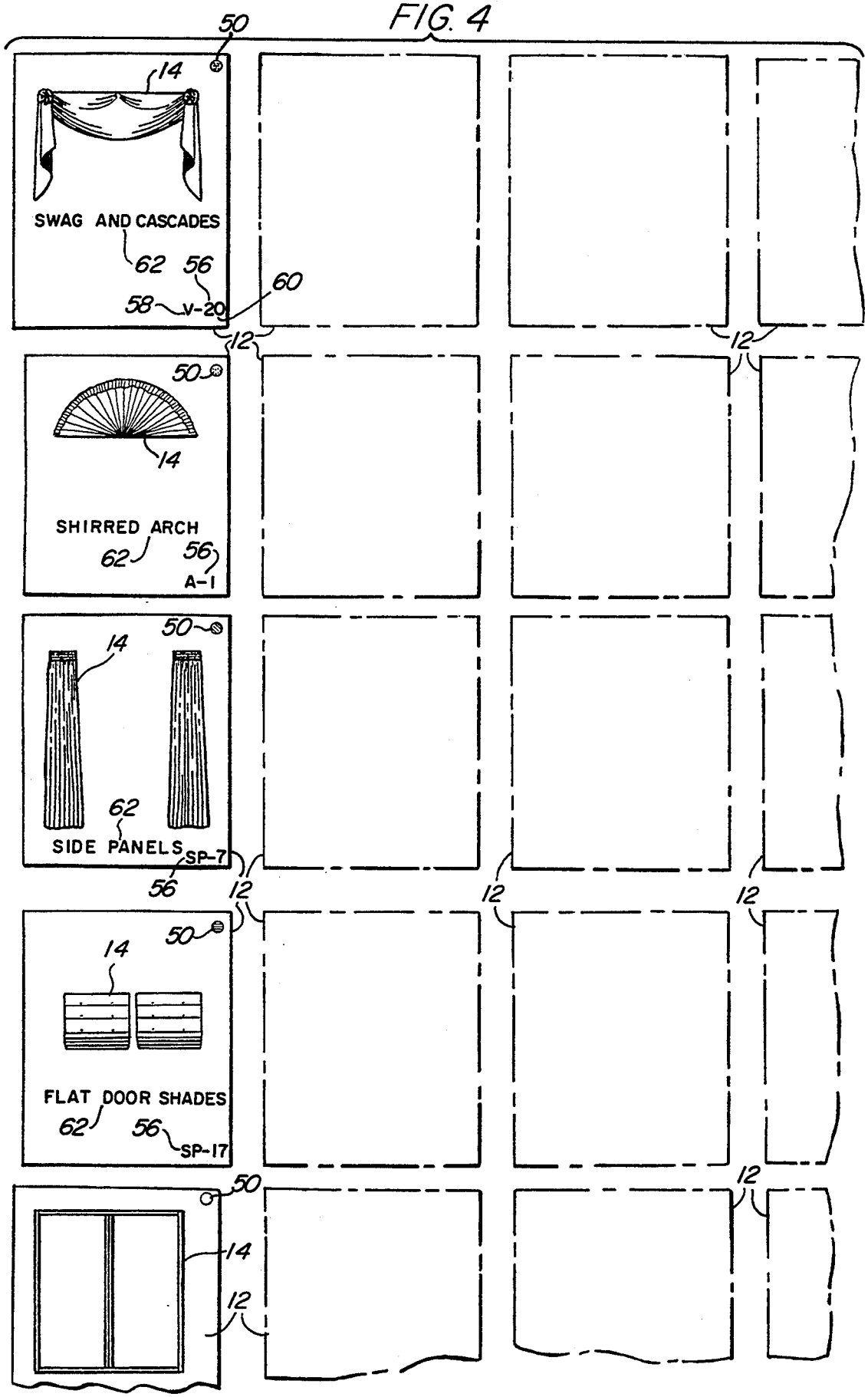
FIG. 10 is a perspective view of an alternate embodiment of the overlay system of the present invention illustrating the use of an overhead projector to view a representation of the composite design.

In an alternate embodiment of the overlay system as illustrated in FIG. 10, the overlay sheets 12 are adapted for viewing on an overhead projector 78 rather than for photocopying. In order to adapt the overlay sheets 12 for viewing on an over head projector 78, the amount of white ink 64 that is used to fill in the detailed outline of the pictorial representation 14 is slightly reduced. Since the white ink 64 is opaque, too much of the design would be blanked out by the opaque portions. The overhead projector 78 displays the representation of the opaque portions and the outline portions as a black image on the projection screen; therefore, an accurate visualization of the window treatment could not be achieved on the overhead projector 78 if the pictorial representations 14 of the design elements were completely filled in with the white ink 64. However, if all of the white ink 64 is removed, there is no clear picture of which portion of the design are opaque in reality. Preferably the white ink 64 will be removed from an interior space which is equivalent in thickness to the black line and is adjacent interiorly to the black lines of the detailed outline. By doubling the thickness of the lines a clear picture of the features of each design element can be achieved on an overhead projector 78 without allowing too much overlapping which will blur the overhead image.

Figure 12:
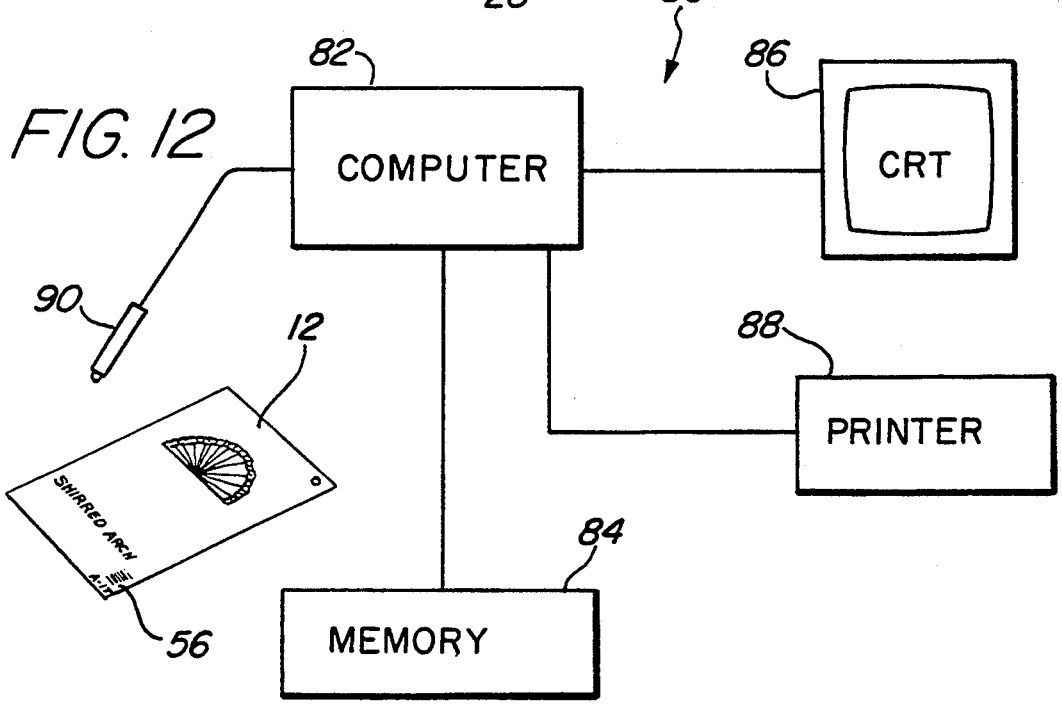
FIG. 12 is a schematic view of an alternate embodiment of the present invention illustrating the use of a computer system to combine the design elements and to view a representation of the composite design.

FIG. 12 illustrates an additional embodiment of the overlay system of the present invention which is adapted for use with a computer system 80. An exemplary computer system 80 as illustrated in FIG. 12 includes a computer (CPU) 82, a memory unit 84, a CRT display screen 86, a printer 88 and a bar code reader 90. The inventory control identifier 56 is preferably represented on the overlay sheet 12 by a bar code. A representation of what appears on each overlay sheet 12 is stored in the memory unit 84 of the computer system 80 and is preferably accessed by the inventory control identifier 56. Preferably, the bar code, representing the inventory control identifier 56, of each overlay sheet 12 that is to be combined is read into the computer system 80 by the bar code reader 90. If desired, the bar code reader 90 can be replaced with a key board, and the inventory control identifiers 56 can be entered into the computer 82 via the keyboard. Once all of the overlay inventory numbers are entered, the computer will collect them, overlay them and present the composition on the screen. The software and hardware required to accomplish this is of the type well known in the art and could be routinely created by one of ordinary skill in the art. Thus the details of the software and hardware are not disclosed herein. The combination of the overlay sheets 12 is displayed on the CRT display screen 86 for the customer to view. In addition, a representation of the composite design which is displayed on the CRT screen 86 may be printed out on the printer 88 of the computer system 80 for the client to take home. In addition, if the client wishes to order the elements of the composite design, using additional cost and inventory information which is stored in the memory unit 84, the computer system 80 which displayed a pictorial representation of the composite design can also be used for ordering the individual design elements. The present invention may be embodied in other specific forms without departing from its spirit or essential characteristics. The described embodiments are to be considered in all respects only as illustrative and not restrictive. For example, the system of the present invention can advantageously be used to assist in the design of the composite systems such as cabinet systems, wall units, exterior window treatments, bedding combinations, etc. In addition, the system of the present invention could be expanded to a larger scale and assist in the design of boats, homes, golf courses, etc. The scope of the invention is, therefore, indicated by the appended claims rather than the foregoing description.

What is claimed is:

1. An apparatus, comprising:

a plurality of base sheets, each of said sheets having a pictorial representation of a specific style of a basic interior design element;

a first plurality of transparent overlay sheets, sized for placement over any one of said base sheets, each of said first plurality of sheets having a pictorial representation of a specific style of a first category of interior design elements of a type which can be used with the basic interior design element; and a second plurality of transparent overlay sheets sized for placement over any one of said base sheets, each of said second plurality of sheets having a pictorial representation of a specific style of a second category of interior design elements of a type which can be used with said basic interior design element;

each of said pictorial representation of each specific style of the basic design element is shown in a standardized size so that each of the first and second plurality of transparent overlay sheets may be applied to each of the base sheets;

the pictorial representations on the base sheets and the first and second plurality of transparent overlay sheets located such that when two sheets, one from each of the first and second plurality of transparent overlay sheets, are placed over a base sheet, a composite design is formed;

said sheets having visual indicia placed thereon to identify and distinguish the categories of design elements, a first visual indicia placed on said plurality of base sheets; a second visual indicia, visually distinguishable from said first indicia, placed on said first plurality of overlay sheets, a third visual indicia, visually distinguishable from said first and second indicia, placed on said second plurality of overlay sheets;

each of said sheets having a written description of the style depicted thereon placed on the sheet such that when two sheets, one from each of the first and second plurality of sheets, are placed over a base sheet, the descriptions on each of the sheets do not interfere and can be read.

2. An overlay system having at least two categories of design elements which enable the formation of a representation of a composite design, said system comprising:
- a first plurality of transparent overlay sheets, each of said first plurality of sheets having a pictorial representation corresponding to a first design element category; and
- a second plurality of transparent overlay sheets, each of said second plurality of sheets having a pictorial representation corresponding to a second design element category;
- said sheets having a visual indicia placed thereon to identify and distinguish the categories of design elements, a first visual indicia placed on said first plurality of overlay sheets; a second visual indicia, visually distinguishable from said first visual indicia, placed on said second plurality of overlay sheets, whereby the sheets corresponding to each design element category are easily identified in use and wherein the visual indicia comprises color.

3. An overlay system having at least two categories of design elements which enable the formation of a representation of a composite design, said system comprising:
- a first plurality of transparent overlay sheets, each having a pictorial representation of a specific style of a first category of design elements; and
- a second plurality of transparent overlay sheets, each having a pictorial representation of a specific style of a second category of design elements;
- said pictorial representations comprising a line drawing wherein the line drawing is done in a dark ink and the portions of the lines which may overlap a portion of a pictorial representation on another overlay sheet are substantially colored in with a lighter opaque ink;
- whereby the final composite look when the transparent overlay sheets are put together and photocopied is a representation of the composite design without the addition of undesirable overlapping lines which would not ordinarily be seen in the actual composite design, as the lines from the design elements which overlap a portion of a pictorial representation on another overlay sheet that would ordinarily be covered up in true life are covered by the lighter opaque ink which will block the light from the photocopying process and will not reproduce the overlapped lines.

4. An overlay system having at least two categories of design elements which enable the formation of a representation of a composite design, said system comprising:
- a first plurality of transparent overlay sheets, each having a pictorial representation of a specific style of a first category of design elements; and
- a second plurality of transparent overlay sheets, each having a pictorial representation of a specific style of a second category of design elements;
- said pictorial representations comprising a line drawing wherein the line drawing is done in a dark ink and the portions of the lines which may overlap a portion of a pictorial representation on another overlay sheet are substantially colored in with a lighter opaque ink;
- whereby the final composite look when the transparent overlay sheets are put together and photocopied is a representation of the composite design without the addition of undesirable overlapping lines which would not ordinarily be seen in the actual composite design, as the lines from the design elements which overlap a portion of a pictorial representation on another overlay sheet that would ordinarily be covered up in true life are covered by the lighter opaque ink which will block the light from the photocopying process and will not reproduce the overlapped lines, wherein the dark ink is black ink and the lighter opaque ink is white opaque ink.

5. An overlay system having a plurality of categories of design elements which enable the formation of a representation of a composite design, said system comprising:
- a plurality of base sheets, each of said sheets having a pictorial representation of a specific style of a basic interior design element;
- a first plurality of transparent overlay sheets, each of said sheets having a pictorial representation of a specific style of a first interior design element; and
- a second plurality of transparent overlay sheets, each of said sheets having a pictorial representation of a specific style of a second interior design element;
- each of said first and second plurality of transparent sheets and said plurality of base sheets having registration indicia whereby the position of the first and second transparent sheets and said base sheets when overlaid with respect to one another can be established by matching the registration indicia on the sheets, wherein the registration indicia is a single dot.

6. An overlay system having a plurality of categories of design elements which enable the formation of a representation of a composite design, said system comprising:
- a plurality of base sheets, each of said sheets having a pictorial representation of a specific style of a basic interior design element;
- a first plurality of transparent overlay sheets, each of said sheets having a pictorial representation of a specific style of a first interior design element; and
- a second plurality of transparent overlay sheets, each of said sheets having a pictorial representation of a specific style of a second interior design element;
- each of said first and second plurality of transparent sheets and said plurality of base sheets having registration indicia whereby the position of the first and second transparent sheets and said base sheets when overlaid with respect to one another can be established by matching the registration indicia on the sheets, wherein the registration indicia is located in two positions on each sheet and these positions are identical with respect to all of the sheets.

7. The overlay system of claim 6, wherein the registration indicia at one of said two positions on each sheet is a dot.

8. The overlay system of claim 6, wherein the registration indicia at one of said two positions on each sheet is different from the registration indicia at the other of said two positions.

9. An overlay system having a plurality of categories of design elements which enable the formation of a representation of a composite design, said system comprising:
- a plurality of base sheets, each of said sheets having a pictorial representation of a specific style of a basic interior design element; and a plurality of transparent overlay sheets sized for placement over any one of said base sheets, each of said plurality of sheets having a pictorial representation of a specific style of a first category of interior design elements;

said pictorial representation of each specific style of a basic interior design element on said plurality of base sheets being made to a standard size despite variations in style and shape of the original design element, so that the pictorial representations on the plurality of transparent sheets can be made to a similar standard size such that when any of the plurality of transparent sheets are laid over any of the base sheets a composite design will be created.

10. An overlay system for selecting interior window treatments, said overlay system comprising:

a plurality of base sheets, each of said sheets having a pictorial representation of a specific style of window; and a plurality of transparent overlay sheets sized for placement over any one of said base sheets, each of said plurality of sheets having a pictorial representation of a specific style of a category of window treatment;

each of the pictorial representations of the window styles depicted on the base sheets is made to a standard size despite variations in the style and shape of the actual window so that each of the overlays may be applied to each of the base sheets.

11. An overlay system having a plurality of categories of design elements which enable the formation of a representation of a composite design, said system comprising:

a plurality of base sheets each of said sheets having a pictorial representation of a specific style of a basic interior design element;

a first plurality of transparent overlay sheets, each of said sheets having a pictorial representation of a specific style of a first interior design element; and a second plurality of transparent overlay sheets, each of said sheets having a pictorial representation of a specific style of a second interior design element;

each of said first and second plurality of transparent sheets and said plurality of base sheets having registration indicia whereby the position of the first and second transparent sheets and said base sheets when overlaid with respect to one another can be established by matching the registration indicia on the sheets, wherein the registration indicia is located in two positions on each sheet and these positions are identical with respect to all of the sheets, wherein the registration indicia at one of said two positions on each sheet is a dot, wherein the dot is a colored dot that identifies the category of design elements to which each sheet belong and wherein each category is identified by a different color dot.

12. An apparatus, comprising:

a plurality of base sheets, each of said sheets having a pictorial representation of a specific style of a basic interior design element;

a first plurality of transparent overlay sheets, sized for placement over any one of said base sheets, each of said first plurality of sheets having a pictorial representation of a specific style of a first category of interior design elements of a type which can be used with the basic interior design element; and a second plurality of transparent overlay sheets sized for placement over any one of said base sheets, each of said second plurality of sheets having a pictorial representation of a specific style of a second category of interior design element of a type which can be used with said basic interior design element;

the pictorial representations on the base sheets and the first and second plurality of transparent overlay sheets located such that when two sheets, one from each of the first and second plurality of transparent overlay sheets, are placed over a base sheet, a composite design is formed;

said sheets having visual indicia placed thereon to identify and distinguish the categories of design elements, a first visual indicia placed on said plurality of base sheets; a second visual indicia, visually distinguishable from said first indicia, placed on said first plurality of overlay sheets, a third visual indicia, visually distinguishable from said first ad second indicia, placed on said second plurality of overlay sheets;

each of said sheets having a written description of the style depicted thereon placed on the sheet such that when two sheets, one from each of the first and second plurality of sheets, are placed over a base sheet, the descriptions on each of the sheets do not interfere and can be read;

said pictorial representations comprising a line drawing wherein the line drawing is done in a dark ink and the portions of the lines which may overlap a portion of a pictorial representation on another overlay sheet are substantially colored in with a lighter opaque ink;

whereby the final composite look when the transparent overlay sheets are put together with a base sheet and photocopied is a representation of the composite design without the addition of undesirable overlapping lines which would not ordinarily be seen in the actual composite design, as the lines from the design elements which overlap a portion of a pictorial representation on another overlay sheet that would ordinarily be covered up in true life are covered by the lighter opaque ink which will block the light from the photocopying process and will not reproduce the overlapped lines.

* * * * *

UNITED STATES PATENT AND TRADEMARK OFFICE
CERTIFICATE OF CORRECTION

PATENT NO. : 5,368,485
DATED : November 29, 1994
INVENTOR(S) : Elizabeth L. Phillips It is certified that error appears in the above-indentified patent and that said Letters Patent is hereby corrected as shown below:

In Column 14 Line 30 please delete "ad" and insert --and--.

Signed and Sealed this

Fourteenth Day of October, 1997

Attest:

BRUCE LEHMAN

Attesting Officer         Commissioner of Patents and Trademarks